United States Patent
Deberry et al.

(10) Patent No.: US 6,387,347 B1
(45) Date of Patent: May 14, 2002

(54) CONTROLLED VAPOR PHASE OXIDATION OF TITANIUM TETRACHLORIDE TO MANUFACTURE TITANIUM DIOXIDE

(75) Inventors: James Clark Deberry, Arnold, MD (US); Michael Robinson, Burgh on Bain (GB); Mark Douglas Pomponi, Ellicott City, MD (US); Anthony J. Beach, Grimsby (GB); Yun Xiong; Kamal Akhtar, both of Ellicott City, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 09/503,880

(22) Filed: Feb. 14, 2000

(51) Int. Cl.$^7$ ............................................. C01G 23/047
(52) U.S. Cl. ....................................................... 423/613
(58) Field of Search ................................. 423/613, 614; 106/437

(56) References Cited

U.S. PATENT DOCUMENTS

| | | | |
|---|---|---|---|
| 3,352,639 A | 11/1967 | Wikswo | |
| 3,463,610 A | * 8/1969 | Groves et al. | 423/614 |
| 3,486,913 A | 12/1969 | Zirngibl et al. | |
| 3,531,247 A | 9/1970 | Comyns et al. | |
| 3,661,522 A | 5/1972 | Colombo et al. | |
| 3,914,396 A | 10/1975 | Bedetti et al. | |
| 4,803,056 A | * 2/1989 | Morris et al. | 423/613 |
| 5,201,949 A | * 4/1993 | Allen et al. | 423/613 |
| 5,204,083 A | * 4/1993 | Magyar et al. | 423/613 |
| 5,556,600 A | 9/1996 | Gebben et al. | |
| 5,599,519 A | * 2/1997 | Haddow | 423/613 |
| 5,698,177 A | 12/1997 | Pratsinis et al. | |
| 5,759,511 A | * 6/1998 | Diemer, Jr. et al. | 423/613 |
| 5,840,112 A | * 11/1998 | Morris et al. | 423/613 |

* cited by examiner

Primary Examiner—Steven Bos
(74) Attorney, Agent, or Firm—Kalow & Springut LLP; David A. Kalow; William D. Schmidt

(57) ABSTRACT

A process for controlling the formation of $TiO_2$ particles in a multi-stage vapor-phase oxidation reactor wherein the process includes the steps of limiting the fraction of $TiCl_4$ converted into $TiO_2$ in the reaction stream of a first or intermediate stage of the reactor under conditions that control the mean residence time distribution of the reacting mass. By running the reaction in this manner, the growth of $TiO_2$ particles produced is so controlled that after subsequent standard finishing steps (e.g. milling) the fraction of particles having an average size of less than 0.5 $\mu$m is reduced or minimized.

31 Claims, No Drawings

CONTROLLED VAPOR PHASE OXIDATION OF TITANIUM TETRACHLORIDE TO MANUFACTURE TITANIUM DIOXIDE

FIELD OF THE INVENTION

The present invention relates to processes in multi-stage gas phase oxidation reactors for controlling particle sizes and particle size distribution of titanium dioxide.

BACKGROUND

Titanium dioxide, $TiO_2$, is well known as the premier pigment for a variety of applications, including paints, coatings, plastics and other such products. The optical properties of $TiO_2$ pigments, in particular light scattering characteristics, are strongly dependent on pigment particle size and particle size distribution. Optimum pigmentary performance (opacifying and thus aesthetic properties of the pigment) is typically achieved when the mean $TiO_2$ particle size is between about 0.2 to about 0.3 μm and the particle size distribution is typically a log normal or geometric distribution having a standard deviation of less than about 1.50.

Two additional pigment-related optical properties are undertone and gloss. These properties are also functions of particle size and distribution. For example, gloss, a particularly important property of certain paint systems using $TiO_2$ pigments, is adversely affected by particulates larger than about 0.5 μm. Additionally, the reflective, or undertone values, of small particles impart a desirable bluish tone in paint systems.

Significant effort has gone into learning how pigments are formed and how to control their manufacture. The prior art is replete with methods purported to solve problems associated with particle size control while maintaining acceptable production rates.

A common process for manufacturing useful rutile titanium dioxide is by the so-called "Chloride Process" which involves a reaction between titanium tetrachloride ($TiCl_4$) vapor and an oxidizing gas, such as air, oxygen or mixtures of such oxidants, to produce particles of $TiO_2$. For example, Equation (I) describes the overall reaction scheme:

$$TiCl_4 + O_2 \rightarrow TiO_2 + 2Cl_2 \quad (I)$$

While not being bound to any one particular theory, in the Chloride Process, $TiO_2$ particles are believed to form by a sequence of three basic steps:

(1) formation of $TiO_2$ nuclei;

(2) nuclei growth to form crystals or single, primary particles; and (3) Single or primary particle agglomeration to form larger clusters of particles wherein the primary particles are held together through various degrees of sintering.

It is well known that the oxidation reaction (I) has a high activation energy. Thus, a significant amount of energy is required to preheat the reactants to initiate the reaction converting $TiCl_4$ and an oxidant into pigmentary $TiO_2$ and to obtain stable reactant conversions. Further, since reaction (I) is also highly exothermic, there is a large increase in the temperature of the efflux stream containing $TiO_2$ from the reactor. Therefore, when substantially all of an initial fraction of a $TiCl_4$/oxidant charge reacts, there is a large heat release causing a significant rise in reactor/reaction mass temperature which increases the rate of the reaction and causes the $TiO_2$ particle growth rate in the reaction mixture to increase. Further, in processes such as the Chloride Process where high throughputs of reactants at high pressures are used, the ability to satisfactorily cool reaction products is reduced or minimized by the temperature increase. Thus, the ability to limit and control the growth of the $TiO_2$ particles to the optimum size range of from about 0.2 to 0.3 μm, while maintaining an acceptable particle size distribution, is lost as higher temperatures result from higher throughputs.

The high temperature conversion of reactants into products tends to lead to large agglomerates of sintered primary $TiO_2$ particles, which are generally detrimental in pigmentary applications. Strongly agglomerated particles, where the agglomerate sizes are greater than about 0.5 μm, typically result when high temperatures and high throughputs are encountered. In order to obtain particle sizes and particle size distributions useful as commercial pigment, energy intensive milling is required.

One variation of producing titanium dioxide via the Chloride Process relies on introducing reactants, titanium tetrachloride and oxidants, through multiple inlets into a reactor. These types of reactors are generally referred to as "multi-stage oxidation reactors" and they are typically designed to allow the heat of reaction generated in one reactor stage to be used to heat the reactants in a subsequent stage thereby improving the economy of operation. Patents describing variations on the multi-stage process of producing pigmentary rutile $TiO_2$ include: U.S. Pat. No. 3,463,610; U.S. Pat. Nos. 4,803,056; 5,599,519; U.S. Pat. No. 5,840,112; and GB Patent 2,037,266B.

U.S. Pat. No. 3,463,610 discloses a process for the production of particulate $TiO_2$ facilitated by the introduction of particulate matter to seed the formation of pigments. The process discloses introducing reactants into the reaction zone through at least two inlets that are spaced long a reaction zone. It is specifically desirable that substantially all of he reactants (or reactant) introduced into the gas stream in the reaction one react completely before that portion of the gas stream reaches the next inlet into the reaction zone where another introduction of reactant(s) is made. Means or steps for ensuring substantially complete reaction of the reactants in each reactor stage are disclosed.

U.S. Pat. No. 4,803,056 describes a multi-stage reactor for increasing production capacity and utilizing the heat of reaction in a multi-stage process for producing $TiO_2$. The patent compares the output of a single stage reactor to that of a similar sized two-stage reactor. The multi-stage reactor relies on splitting the total flow of $TiCl_4$ and subsequently completely reacting it with excess oxygen. The excess heat in the first reactor stage is then used to heat the remainder of the $TiCl_4$ added in the final reactor stage.

U.S. Pat. No. 5,599,519 describes a multi-stage process for producing titanium dioxide which avoids the need for auxiliary heating of the reactants using known means such as hydrocarbon combustion or electric discharge. The patent discloses that complete reaction of titanium tetrachloride in each stage should be achieved prior to adding any additional $TiCl_4$ in a subsequent reactor stage.

An objective of each of these patents is to react substantially all of the $TiCl_4$ added in each stage of the multi-stage reactor prior to passing the reacted mass into a subsequent reactor stage where any additional reactants may be added.

U.S. Pat. No. 5,840,112 additionally discloses a multi-stage process for producing $TiO_2$ where oxygen is separately introduced in significantly less than stoichiometric quantities into each stage of the reactor and at differing temperatures to control the reaction. This patent also describes secondary additions of $TiCl_4$, but does not disclose limited lo conversion of $TiCl_4$ in the presence of excess oxygen, nor the control of $TiCl_4$ conversion within the reactor in order to affect the particle size distribution of titania produced.

Thus, based on the prior art, there still exists a need for improved methods of producing titania pigments which do not yield excessive quantities of undesirably sintered primary particles which typically result from a substantially complete conversion of reactants in a particular stage of a multi-stage reactor.

SUMMARY OF THE INVENTION

An objective of the present invention is to provide a process for producing $TiO_2$ having fewer, smaller, or more easily milled titania agglomerates, while potentially increasing the production rate of pigment by controlling the extent or degree of conversion of titanium tetrachloride into titanium dioxide within a first or intermediate reactor stage.

A second objective is to provide a stable yet flexible process for producing $TiO_2$ in a multi-stage gas phase reactor wherein there are multivariate controls over the reaction profile within the reactor. A third objective of the invention is to provide an independent means for flexible reaction temperature profile control in a second or subsequent stage of a reactor when practicing the methods of the present invention.

With a view to these objectives, it has been discovered surprisingly that by actively controlling the percentage of $TiCl_4$ conversion in a first or intermediate reaction zone, prior to a subsequent reaction zone, the production of optimum particle sized $TiO_2$ may be achieved, thereby reducing the need for expensive, time consuming, energy intensive milling steps.

In other embodiments, the present invention provides processes for producing titanium dioxide in multi-stage gas phase reactors wherein the growth of the titanium dioxide particles is limited. The processes comprising reacting in a first stage of the reactor only a fraction of the titanium tetrachloride of an initial gaseous mixture comprising titanium tetrachloride with an oxygen-containing gas. This reaction forms a reaction mixture comprising titanium tetrachloride, titanium dioxide, chlorine and oxygen. Further, this reaction is effected under conditions such that the reaction mixture is resident in a first, or intermediate reactor stage for a mean residence time that limits the growth of the titanium dioxide particles produced. Thereafter, in subsequent stages of the reactor, additional gaseous mixtures comprising titanium tetrachloride may be reacted with the reaction mixture from a preceding reactor stage.

In another embodiment the present invention comprises reacting in a first stage of a multi-stage reactor a fraction of an initial charge comprising titanium tetrachloride with an excess of an oxygen-containing gas under conditions that limit the first stage temperature to a maximum of not greater than about 1400° C. Thereafter, in any subsequent stages of the reactor, titanium tetrachloride is reacted with an oxygen-containing gas under conditions that limit such subsequent stage temperatures to a maximum of not greater than about 1600° C.

In yet another embodiment of the invention, liquid titanium tetrachloride is added to the initial gaseous mixture of titanium tetrachloride, added to a second or subsequent reactor stage, thereby forming an admixture having a lower temperature, prior to introducing the admixture into a second, or subsequent reactor stage. This process is termed "desuperheating" and may be accomplished using any of a variety of desuperheaters used in other applications assuming that the desuperheater is constructed so as to be adapted to a gas phase chloride reactor (e.g. materials of construction and the like). In a preferred embodiment, the process comprises combining the prior two embodiments.

Various alternatives may be used to facilitate the objectives of the invention. The following embodiments are presented to aid in an understanding of the present invention and are not intended to, and should not be construed to, limit the invention in any way. All alternatives, modifications and equivalents which may becomes obviousness to those of ordinary skill upon a reading of the present disclosure are included within the spirit and scope of the present invention.

DETAILED DESCRIPTION

As this disclosure is not a primer on $TiO_2$ pigment production or on the design nor manufacture of oxidation reactors, basic concepts known to those skilled in the field of $TiO_2$ production have not been set forth in detail. Concepts such as choosing appropriate reactor manufacturing materials, or appropriate additives for the oxidation reaction producing titania pigment, or suitable conditions for typical operation of oxidation-type reactors are readily determinable by those skilled in the industry and are generally described in the prior art. Attention is therefore directed to the appropriate texts and references known to those skilled in the art in regard to these matters.

Mean residence time (t) is basically a function of the volume of the reactor (V), and the volumetric flow rate of the reactants (Q), and may be simply stated as in Equation (II):

$$t = (Q/V) \quad (II)$$

At a given temperature and pressure, the longer the mean residence time, the greater the conversion of $TiCl_4$ to $TiO_2$, until substantially 100% conversion is achieved. However, for a given mass of $TiCl_4$ and oxygen, the amount of total heat liberated by the exothermic reaction between the two components is in fixed proportion to the amounts actually reacted.

In practice, the distribution of residence times within a reaction vessel is a complex function of mixing intensity, density of gases and temperature profiles. Further, since mixing is not instantaneous, there is a distribution of temperatures and reactant conversions across the reaction zone for a given mean residence time. These parameters may be calculated using equations well known in the art of fluid mechanics and kinetic theory.

To practice the present inventive process, the physical parameters of a first or intermediate reaction zone of a multiple stage reactor are adjusted for anticipated process conditions as described by Equation (II) to achieve the desired percent conversion of titanium tetrachloride at the end of that reaction zone. Generally, mean residence times of less than 30 milliseconds are preferred in the first or intermediate reaction zone, with times between 0.1 and 20 milliseconds being more preferred.

Once the mean residence time in a reacting stage has been shortened to less than that length of time required for substantially 100 percent conversion, the initial mixing rates between the reactants may be used to further adjust the extent of titanium tetrachloride conversion achieved by controlling the flow of $TiCl_4$ into the reaction zone. The flow may be controlled by, for example, adjusting the width of the slots or orifices through which $TiCl_4$ enters a reaction zone. As one of ordinary skill will understand, provided there is sufficient energy to drive the reaction rapidly, an increase in slot width will generally decrease the initial mixing rates of the reactants and broaden the distribution of conversion of the reactants across the reactor cross section. Decreased mixing will delay the reaction, which will decrease both the maximum temperature in the reactor and the time the newly formed titania is exposed to that temperature in that reaction stage.

It will be understood by those of skill in the art that a complete, quantitative conversion (100 percent) of reactants into products is difficult to achieve in practice. For the purposes of this disclosure, complete conversion of reactants is defined as reacting substantially all of a reactant added to a reactor or a reactor stage, e.g. approaching about 100 percent conversion, given the practical operating limitations of a particular reactor.

Incomplete conversion may be achieved by controlling the residence time distribution of the reactants in the reactor. For the purposes of this disclosure, the mean residence time is that time which would be required for the volume of the reactants to pass through a reactor stage if no reaction were to take place.

Partial conversion of titanium tetrachloride controls the liberation of reaction energy. It is believed that partial conversion tends to equilibrate the liberated reaction energy across the remaining greater mass of reacted and unreacted reagents and product within the reactor, the unreacted mass essentially acting as a heat sink, providing additional stabilizing control over the reaction. "Partial conversion" thus allows a substantial increase in the minimum reactor temperature (at which the reaction is run) over that minimum temperature which is required to minimally initiate the reaction converting $TiCl_4$ into titanium dioxide. In contrast to the extreme temperatures and longer time periods involved in conventional processes, where complete conversion of the reactants occur, the "partial conversion" process limits the time that newly formed titania particles see extremely high temperatures. This limits particle sintering that would otherwise be encountered with higher initiation temperatures.

Control of the mean residence time, and thus the extent of reactant conversion, may be easily achieved by manipulating combinations of variables well known to those of skill in the art. Those variables include, but are not limited to, the reactant concentrations, reactor pressures, flow rates of reactants, reaction zone dimensions, the turbulent mixing rates of incoming reactant streams, reactant temperatures and the like.

The mean temperature at the end of a first or intermediate reaction zone(s) should be at least about 900° C., but less than about 1600° C. Temperatures between about 1200° C. to about 1600° C. are more preferred. Specifically, incomplete conversion typically limits the maximum temperature to about 1200° C. that is sufficient to ensure greater than 99 percent rutilization of the final product.

In practicing the present invention, partial conversions of between about 30% to about 70% of the $TiCl_4$ added to each of a first or intermediate reaction zone(s) are preferred. It is more preferred that between about 40% to about 60% of the $TiCl_4$ added to a first or intermediate reaction zone(s) be converted to $TiO_2$ by the end of the reaction zone(s).

For a given set of conditions, higher temperatures and longer exposure times lead to numerous undesirably large particles having increased degrees of agglomeration. In particular, these agglomerates, with strong intra-agglomerate bonding, are a limiting factor in producing commercial quality pigment. Strongly bound agglomerates must be milled, and milling is expensive and limits overall process productivity. Thus, controlling the maximum reaction temperature and reducing the amount of time that newly formed $TiO_2$ particles are subjected to high temperatures in the reactor are effective means of limiting particle and agglomerate growth.

With a view to practicing the present invention, any conventional type of corrosion resistant reaction vessel suitable for multi-stage operation may be employed. The vessel must be of such design, construction and dimension that a continuous flow of reactants and products within and through the oxidation chamber(s) will be afforded and such control over the velocities, mixing rates, temperatures, and thus residence times distributions, will be permitted. A typical reactor useful to practice the methods of the present invention may include a combustion chamber for preheating reactants and other such associated equipment as may be necessary for the safe operation of a multi-stage reactor to produce titania from $TiCl_4$ and an oxidant according to the present invention.

The oxygen required for the reaction in the process of the present invention may be introduced into the first or subsequent zone of the multi-stage vapor-phase reactor by any suitable means, such as a stream of oxidizing gas from a combustion chamber. This stream may comprise air, oxygen-enriched air, or substantially pure oxygen. The total quantity of oxygen added must be sufficient to fully react with the total quantity of $TiCl_4$ added to all of the zones of the reactor. The stream of oxidizing gas may be preheated by any variety of means well known in the art to a temperature between about 600° C. to about 1000° C. prior to being introduced into the combustion chamber. In a combustion chamber the oxidizing gas temperature may be further raised to between about 1300° C. to about 1700° C. by the combustion of a suitable fuel, for example a hydrocarbon fuel or other fuel known in the art. Other known means of raising the temperature also may be suitably employed. Depending on the preheating process employed, the stream of oxidizing gas feeding the reactor may be dry and relatively pure, but typically contains between about 50 PPM to about 200,000 PPM of water vapor based on the weight of $TiO_2$ produced as would be known to the skilled artisan.

In processes of the present invention, $TiCl_4$ is heated to typically, although not limited to, between about 250° C. to about 450° C., with temperatures between about 300° C. to about 400° C. being preferred.

A vaporizer or other such device well known in the art is useful for conditioning titanium tetrachloride. The vaporized $TiCl_4$ is added to at least two or more inlet points in the reactor using means such as those disclosed by U.S. Pat. No. 3,512,219, the teachings of which are hereby incorporated by reference.

$TiCl_4$ added to a first or subsequent reaction zone may be relatively pure, but is typically added as an admixture with aluminum chloride. The amount of aluminum chloride added to the reactor is such that the product comprises between about 0.1 to about 5 percent by weight of aluminum oxide. To achieve the desired admixture of $TiCl_4$ and aluminum chloride for adding to the reactor, the preheated $TiCl_4$ can be passed through any one of a number of types of aluminum chloride generators as described in the prior art. Passage through the aluminum chloride generator can be used also to raise the temperature of the $TiCl_4$ to typically between about 375° C. to about 660° C.

It is advantageous to have the titanium tetrachloride admixture entering a second or subsequent stage be at a lower temperature, thereby having a beneficial effect on controlling particle growth and agglomeration. The temperature of the reaction mixture entering a second or subsequent stage will be reduced by the addition of cooler TiCl$_4$ thereby controlling particle growth and agglomeration.

The temperature of the TiCl$_4$ entering the second and subsequent stages can be generated at colder temperatures or from a single source reduced by any one of a number of heat exchange methods. However, in order to improve the process flexibility and impart operational stability to the process it has been suprisingly discovered that temperature reductions into a second or subsequent reactor stage may be beneficially achieved by passing the preheated TiCl$_4$ gas feed through a "direct contact desuperheater" or "attemperator". Such devices are well known in the art of steam generation but have not been disclosed previously as means for controlling the temperature of a stream of TiCl$_4$-containing gases being injected into a multi-stage chloride process reactor to produce titanium dioxide. A desuperheater useful in the present process may be as simple as a venturi-type device positioned inside a flow stream of titanium tetrachloride gas wherein the temperature of the hot titanium tetrachloride gases are moderated by evaporation of liquid TiCl$_4$ which is supplied at a lower temperature through the desuperheater. The process of using a liquid to control the temperature of the vaporized mixture entering a second or subsequent stage of the reactor is termed "desuperheating."

Applying desuperheating technology to the Chloride Process confers numerous advantages, including low capital cost, simple and robust ease of process control, and the flexibility to control TiCl$_4$ gas feed at any temperature between the normal process temperature and the saturation temperature of the gas, at the operating pressure selected. Additionally, because the desuperheater method takes maximum advantage of the latent heat of vaporization of the liquid titanium tetrachloride for cooling, a full range of temperatures may be achieved without unduly altering the concentration of any AlCl$_3$ or other additive that might be added to each reactor stage feed. Thus, with this method of temperature control, potentially detrimental reductions of aluminum trichloride concentration in the titanium tetrachloride feed gas for second and subsequent stages can be minimized. If desired, a titanium tetrachloride solution containing dissolved aluminum trichloride may be supplied to the desuperheater providing additional process flexibility. Finally, by reducing the TiCl$_4$ feed temperature from a higher level in this fashion, a robust process is obtained wherein an adequate range of temperatures are continuously available to a second or subsequent reactor stage to ensure the reaction stability and control to completion. A simple change of the liquid spray volume from the desuperheater is all that is required to restore or elevate reaction temperatures as necessary to control the correct percentage conversion of TiCl$_4$. This feature improves the ability to operate the process close to the otherwise limiting lower process temperatures, hence allowing maximum benefit of the desuperheater technology to be realized.

Productivity is also enhanced by desuperheating the titanium tetrachloride gaseous feed into a second or subsequent stage of the reactor as illustrated by the examples. The extent of desuperheating useful in the present invention is between about 100° C. to about 350° C. and preferably between about 125° C. to about 225° C.

In the process of this invention, the multi-stage reactor is operated at a pressure above atmospheric pressure. In the preferred mode the reaction is carried out at a pressure of at least about 5 psig. In general the pressure within the reactor will be between about 5 psig to about 100 psig, although higher pressures are possible and become more attractive using the disclosed processes. In a preferred process, a pressure of about 60 psig is used.

The reaction may be carried out in the presence of useful alkali additives (for example, the halide salts of alkali metal) and water vapor as is described in U.S. Pat. No. 3,208,666, U.S. Pat. No. 5,201,949 or GB 2,037,266B. Growth retardants such as alkali metal halides, including lithium, sodium, potassium, rubidium and cesium halides, may be added to one of the reactants prior to contact in the first reaction zone or prior to introduction into subsequent stages. The amount of alkali metal halide added may be up to about 3000 ppm based on the weight of TiO$_2$ produced. In a more preferred process, metal halide is added between a concentration of about 5 ppm to about 1000 ppm while the most preferred concentration range is between about 10 ppm to about 500 ppm.

The suspension of TiO$_2$ in chlorine and other diluent gases formed in a reactor may be cooled in a flue device such as that disclosed in U.S. Pat. No. 2,657,979, the teachings of which are hereby incorporated by reference, or another equivalent device. Granular scouring particles, or "scrubs" (for instance, sodium chloride, sand or calcined TiO$_2$) maybe added to the flue to scrape away deposits of TiO$_2$ on the internal surface of the flue pipe as disclosed in U.S. Pat. Nos. 2,721,626 and 3,511,308, the teachings of which are incorporated by reference.

Cooled pigment is typically separated from chlorine and any other gases and collected for further processing by filtration or other gas-solid separation techniques as are known in the art.

To assist in a clearer understanding of the invention, the following Examples, summarized in TABLE 1, are provided.

TABLE 1

| Example | Production Rate (Metric tons/hour) | Percent of TiCl$_4$ Introduced in First Stage Converted to TiO$_2$ | Desuperheat (° C.) | IOU | Percent particles >0.5 µm |
| --- | --- | --- | --- | --- | --- |
| Comparative Example | 16 | 100 | 0 | −2.4 | 16 |
| 1.1 | 16 | 60 | 0 | −4.5 | 9 |
| 1.2 | 17 | 60 | 0 | −3.5 | 12 |
| 1.3 | 18 | 60 | 0 | −2.5 | 16 |
| 2.1 | 16 | 100 | 175 | −3.5 | 12 |
| 2.2 | 17.5 | 100 | 175 | −2.4 | 16 |
| 3.1 | 17.5 | 60 | 175 | −4.5 | 7 |
| 3.2 | 19 | 60 | 175 | −3.5 | 12 |
| 3.3 | 22 | 60 | 175 | −2.5 | 16 |

The Comparative Example shows the results of the production of pigments by a typical multi-stage gas phase reaction process operated in the conventional manner of substantially complete conversion of reactants in each stage of the reactor. Examples 1.1, 1.2, and 1.3 demonstrate the effect of limiting the conversion of reactants in the first stage pursuant to the disclosed invention, with Examples 1.2 and 1.3 demonstrating the ability to achieve a desired quality of pigment at higher reactant throughputs using this method alone.

Examples 2.1 and 2.2 demonstrate the effect of controlling the temperature of a second stage $TiCl_4$ addition by means of a desuperheater using a "desuperheating" process in accordance with the present invention. Example 2.2 demonstrates achievement of desired product quality at higher reactant throughputs using this technique alone. Examples 3.1, 3.2, and 3.3 illustrate preferred embodiments of the present invention, with Examples 3.2 and 3.3 demonstrating the ability to achieve desired product quality at much higher production rates using various combined methods of the invention.

Titanium dioxide products were tested by a variety of methods known to those skilled in the art, including Iron Oxide Undertone (IOU), as a measure of particle size. IOU is described in greater detail for example in ASTM D 6131: "Standard Test Method for Evaluating the Relative Tint Undertone of Titanium Dioxide Pigment". Generally, the smaller or more negative the IOU, the smaller the particles. The relative blueness of the prepared samples were measured on a COLORVIEW (TM) available from Gardner Instruments, Columbia Md. Fine particles have more negative undertone numbers and give a bluer undertone. Larger particles impart a yellowish tone that is reflected in less negative or more positive undertone numbers. Depending on the production conditions, the IOU (at the point of discharge from the reactor) for $TiO_2$ particles used in paints, for example, may typically be about −3.0 to −2.0. Thus, a change in agglomerate size will be reflected in a corresponding change in the value returned by the IOU test.

Particle size distribution of the pigment products maybe measured by optical light scattering. The particle size distribution of the product and the percentage of particles less than 0.5 μm indicate the potential for maximum gloss in the finished product. Samples were milled using a planetary mill incorporating commercially available synthetic zirconia compounds as grinding media.

Comparative Example $TiCl_4$ was preheated to 350° C., mixed with chlorine and passed through a bed containing aluminum. The rate of $TiCl_4$ feed corresponded to a $TiO_2$ production rate of 16 metric tons per hour (mtph). The exothermic reaction between chlorine and aluminum generated aluminum chloride and heat. The heat of reaction raised the temperature of the $TiCl_4/AlCl_3$ mixture to about 450–460° C. at the point of entry into the reactor. The $AlCl_3$ in the mixture provided one percent by weight of $Al_2O_3$ on reaction with oxygen based on the weight of $TiO_2$ formed. This $TiCl_4/AlCl_3$ mixture was split into two streams by means of flow control devices. The first stream was introduced into the first reaction zone through a first reactor stage $TiCl_4$ slot. Simultaneously, preheated oxygen having been further heated by hydrocarbon combustion to about 1500° C. was introduced into the reactor through a separate inlet into the reaction zone. Trace amounts of KCl dissolved in water were sprayed into the hot oxygen stream (as disclosed in U.S. Pat. No. 3,208,866). The heat generated by the reaction resulted in the mean downstream temperature of the first stage was estimated at exceeding 1500° C. wherein substantially all of the $TiCl_4$ added at the first stage was converted to $TiO_2$. The amount of oxygen introduced into the reaction zone was sufficient to react with all of the first stage $TiCl_4$ and all of the second stage $TiCl_4$. The products of the first stage reaction together with the unreacted oxygen were subsequently mixed with the remaining second stage $TiCl_4$ in the second reaction zone. The suspension of $TiO_2$ formed in the second stage was introduced into a flue pipe containing scrubs. The $TiO_2$ was separated from cooled gaseous products by filtration. The product $TiO_2$ was examined for particle size distribution, percent coarse fraction, IOU (undertone) and percent rutile. The mean particle size was 0.308 μm with a standard deviation of 1.46. The coarse fraction (percent greater than 0.5 μm) was 16%. The IOU was −2.4 and the rutile content was greater than 99.5 percent.

Example 1.1

Partial Conversion of Titanium Tetrachloride

The process of the Comparative Example was repeated except the reactor was configured to limit conversion of $TiCl_4$ in the first stage to about 60%. The incomplete conversion led to an estimated first stage mean reaction temperature of 1300° C., which is substantially lower than that estimated in the Comparative Example. The $TiO_2$ product had a mean particle size of 0.284 μm and a geometric standard deviation of 1.46. The coarse fraction (percent greater than 0.5 μm) was 9 percent. The IOU was −4.5 and the rutile content was greater than 99.5 percent.

Example 1.2

Partial Conversion of Titanium Tetrachloride

The conditions of Example 1.1 above were repeated, except that the production rate was increased to 17 metric tons per hour. When the rate was increased, the IOU number was −3.5.

Example 1.3

Partial Conversion of Titanium Tetrachloride

The conditions of Example 1.1 above were repeated, except that the production rate was increased to 18 metric tons per hour. At 18 metric tons per hour the IOU was −2.5. This experiment demonstrates maintaining product quality while producing $TiO_2$ at rates of 2 metric tons per hour higher than the Comparative Example.

Example 2.1

Desuperheating

The process of the Comparative Example was repeated except that the $TiCl_4/AlCl_3$ gaseous mixture going into the second stage was cooled by 175° C. by desuperheating or attemporating. The estimated first stage mixture temperature was unchanged. The mean particle size from these conditions after standardized milling was 0.292 μm with a standard deviation of 1.46. The coarse fraction, percent greater than 0.5 μm, was 12%. The IOU was −3.5 and the rutile content was greater than 99.5 percent.

Example 2.2

Desuperheating

The conditions of Example 2.1 were duplicated, except that the rate of $TiO_2$ production was increased from 16 metric tons per hour to 17.5 metric tons per hour. At these higher production rates the particle sizes increased to the levels of the Comparative Example, (about 0.308 μm) and the IOU values increased to previous levels (−2.4).

Example 3.1
Partial Conversion of TiCl$_4$ and Desuperheating

The process of the Comparative Example was repeated. However, the reactor was reconfigured to limit the conversion in the first reactor stage such that only about 60 percent of first stage TiCl$_4$ was converted to titania, and the second stage TiCl$_4$ feed temperature was desuperheated or attemporated by 175° C. Incomplete first stage conversion led to an estimated first stage reaction temperature of about 1300° C., substantially lower than that estimated in Comparative Example 1. The TiO$_2$ product had a mean particle size of 0.282 μm and a geometric standard deviation of 1.45. The coarse fraction (percent greater than 0.5 μm) was 7 percent. The IOU was −4.5 and the rutile content was greater than 99.5 percent.

Example 3.2
Partial Conversion and Desuperheating

The process of Example 3.1 was repeated, except the production rate was increased to 19 metric tons per hour. When the rate was increased to 19 metric tons per hour, the IOU was −3.5.

Example 3.3
Partial Conversion and Desuperheating

The process of Example 3.1 was repeated, except the production rate was increased to 22 metric tons per hour. When the rate was increased to 22 mtph, the observed IOU was −2.5.

The exemplified methods of the invention illustrate the operation of reactors at rates six metric tons per hour higher (about 37 percent) than was achieved without the methods of the invention. Useful product specifications meeting typical industry standards also were met.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A process for producing titanium dioxide in a multi-stage gas phase reactor, the process comprising the steps of:
   (a) reacting in a first stage of the multi-stage gas phase reactor a fraction of a first gaseous mixture comprising titanium tetrachloride with an oxygen-containing gas to form a reaction mixture comprising titanium tetrachloride, titanium dioxide, chlorine and oxygen, the reaction being effected under conditions such that the reaction mixture has a mean residence time in the first stage which limits growth of titanium dioxide particles produced, wherein the fraction of the titanium tetrachloride of the first gaseous mixture reacting in the first stage of the reactor is not greater than about 70 percent; and
   (b) reacting in a subsequent stage of the reactor a second or subsequent gaseous mixture comprising titanium tetrachloride with the reaction mixture from the first stage.

2. The process of claim 1, wherein the mean residence time of the first gaseous mixture of step (a) is less than about 20 milliseconds.

3. The process of claim 1, which further comprises adding liquid titanium tetrachloride to a gaseous mixture comprising titanium tetrachloride to reduce the temperature of the second gaseous mixture prior to the reaction of step (b).

4. The process of claim 1, wherein the first gaseous mixture has a mean residence time in the first stage of less than about 30 milliseconds.

5. The process of claim 1, wherein the first gaseous mixture has a mean residence time in the first stage of between about 0.1 to about 20 milliseconds.

6. The process of claim 1, wherein the reaction mixture has a reaction temperature of between about 900° C. to about 1600° C.

7. The process of claim 1, wherein the reaction mixture has a temperature of between about 1200° C. to about 1600° C.

8. The process of claim 1, wherein the fraction of the titanium tetrachloride in the first gaseous mixture reacting in the first stage of the reactor is from about 30 percent to about 70 percent.

9. The process of claim 1, wherein the first gaseous mixture comprises from about 10% to about 90% of the total amount of titanium tetrachloride added to the reactor.

10. The process of claim 1, wherein the first gaseous mixture of step (a) is at a temperature from about 350° C. to about 650° C.

11. The process of claim 1, wherein an alkali metal halide is present in the first gaseous mixture, the subsequent gaseous mixture, the oxygen-containing gas, or combinations thereof.

12. The process of claim 11, wherein the alkali metal halide comprises an alkali metal selected from the group consisting of lithium, sodium, potassium, rubidium and cesium and is present in an amount between about 1 ppm to about 3000 ppm of the total amount of titanium dioxide formed.

13. The process of claim 1, wherein the first gaseous mixture, the subsequent gaseous mixture, or a combination thereof further comprises aluminum chloride.

14. A process for producing titanium dioxide in a multi-stage gas phase reactor, the process comprising:
   (a) reacting in a first stage of the reactor a fraction of titanium tetrachloride of a first gaseous mixture comprising titanium tetrachloride with an oxygen-containing gas to form a reaction mixture comprising titanium tetrachloride, titanium dioxide, chlorine and oxygen;
   (b) adding liquid titanium tetrachloride to a second or subsequent gaseous mixture comprising titanium tetrachloride to form an admixture having a temperature lower than that of the second or subsequent gaseous mixture; and
   (c) reacting in a subsequent stage of the reactor the admixture with the reaction mixture of step (a) or an intermediate stage thereof.

15. The process of claim 14, wherein the fraction of the titanium tetrachloride of the first gaseous mixture reacting in the first stage of the reactor is not greater than about 70 percent.

16. The process of claim 14, wherein the reaction of step (a) is effected under conditions such that the reaction mixture has a mean residence time in the first stage which limits titanium dioxide particle growth.

17. The process of claim 16, wherein the first gaseous mixture has a mean residence time in the first stage of less than about 30 milliseconds.

18. The process of claim 16, wherein the first gaseous mixture has a mean residence time in the first stage of between about 0.1 to about 20 milliseconds.

19. The process of claim 14, wherein the reaction mixture has a reaction temperature of between about 900° C. to about 1600° C.

20. The process of claim 14, wherein the reaction mixture has a temperature of between about 1200° C. to about 1600° C.

21. The process of claim 14, wherein the fraction of the titanium tetrachloride in the first gaseous mixture reacting in the first stage of the reactor is from about 30% to about 70%.

22. The process of claim 14, wherein the first gaseous mixture comprises from about 10% to about 90% of the total amount of titanium tetrachloride added to the reactor.

23. The process of claim 14, wherein the first gaseous mixture of step (a) is at a temperature from about 350° C. to about 550° C.

24. The process of claim 14, wherein the temperature of the admixture comprising titanium tetrachloride of step (b) is from about 100° C. to about 550° C.

25. The process of claim 14, wherein the temperature of the admixture of step (b) is from about 100° C. to about 250° C. lower than that of the second or subsequent gaseous mixture comprising titanium tetrachloride.

26. The process of claim 14, wherein an alkali metal halide is present in the first gaseous mixture.

27. The process of claim 26, wherein the alkali metal halide comprises an alkali metal selected from the group consisting of lithium, sodium, potassium, rubidium and cesium and is present in an amount between about 1 ppm to about 3000 ppm of the total amount of titanium dioxide formed.

28. The process of claim 14, wherein the first or subsequent gaseous mixtures, or combinations thereof further comprises aluminum chloride.

29. A process for controlling and limiting the particle size of titanium dioxide being produced in a multi-stage oxidation reactor, the process comprising the steps of:
- (a) reacting in a first stage of the reactor a fraction of titanium tetrachloride of a first gaseous mixture comprising titanium tetrachloride with an oxygen-containing gas to form a reaction mixture comprising titanium tetrachloride, titanium dioxide, chlorine and oxygen, the reaction being effected under conditions such that the reaction mixture has a mean residence time in the first stage which limits titanium dioxide particle growth and agglomeration;
- (b) adding liquid titanium tetrachloride to a second gaseous mixture comprising titanium tetrachloride to form an admixture having a temperature lower than that of the second gaseous mixture, and
- (c) reacting in a second stage of the reactor the admixture with the reaction mixture of step (a).

30. A process of controlling the temperature of a stream of vaporized titanium tetrachloride added into a stage of a gas phase reactor, comprising adding an admixture of a liquid titanium tetrachloride to a gaseous stream comprising titanium tetrachloride, wherein the addition is accomplished with a desuperheater.

31. A process according to claim 30, wherein the desuperheater is a venturi further comprising a liquid spray nozzle and means for controlling liquid flow.

* * * * *